Patented Mar. 24, 1936

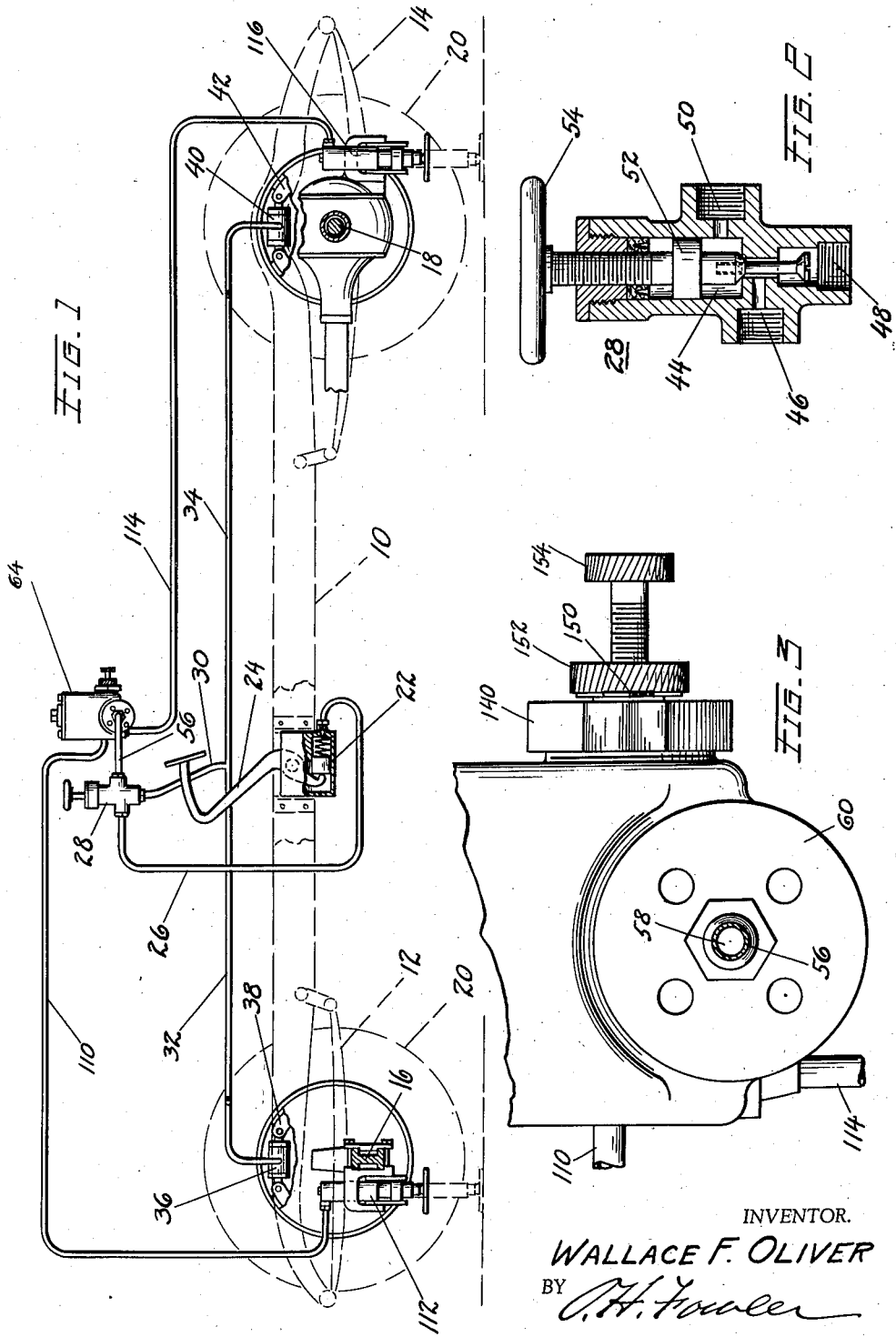

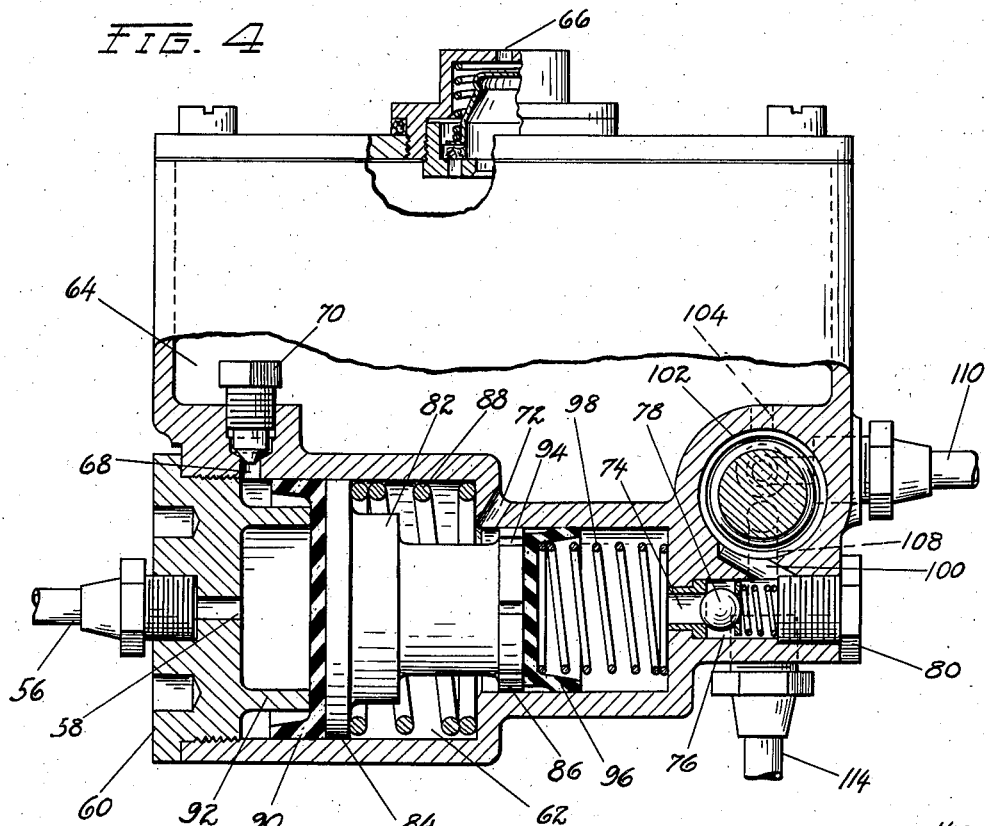
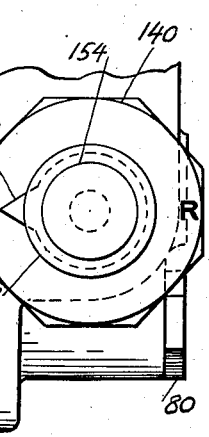

2,035,336

UNITED STATES PATENT OFFICE 2,035,336

HYDRAULIC SYSTEM FOR JACKS

Wallace F. Oliver, Detroit, Mich., assignor to Hydraulic Brake Company, Detroit, Mich., a corporation of California Application May 11, 1933, Serial No. 670,611

8 Claims. (Cl. 303—6)

This invention relates to jacks, and more particularly to fluid pressure systems for operating a plurality of hydraulic jacks.

The invention comprehends a fluid pressure system for operating jacks coupled with a fluid pressure system for operating brakes. In the illustrated embodiment of the invention a pressure producing element or a master cylinder operable through a foot pedal lever is used to displace fluid to actuate a plurality of expansible elements or fluid pressure actuated motors associated with the friction elements of the brakes, and the pipe line or conduit leading from the master cylinder to branch conduits connected to the expansible elements associated with the brakes has interposed therein a two-way valve.

This valve is normally adjusted so that regular operations of the brakes will not be disturbed. However, the valve may be adjusted to eliminate the motors associated with the brakes and when so adjusted a pump is cut in to deliver fluid under pressure to the jacks. This pump is operated by the master cylinder actuated through the foot pedal lever.

An object of the invention is to provide a fluid pressure system for operating a plurality of jacks including a pump operated by a pressure producing element or a master cylinder actuated by a foot pedal lever.

Another object of the invention is to provide a fluid pressure system for actuating a plurality of jacks coupled with a fluid pressure system for actuating a plurality of brakes so that certain elements used in the operation of the brakes may be used in the operation of the jacks.

Another object of the invention is to provide a system for operating jacks and brakes, including means for selectively eliminating either the jacks or the brakes, and means for selectively operating the individual jacks.

Yet a further object of the invention is to provide hydraulic means for operating a plurality of jacks combined with hydraulic means for operating a plurality of brakes in which the operating means and the pressure producing means is common to both.

The above and other objects and features of the invention including various novel and desirable details of construction will be apparent from the following description of the illustrated embodiment, in which,—

Figure 1 is a side elevation of a motor vehicle chassis illustrating the invention as applied;

Figure 2 is a sectional view of a two-way valve which may be coupled in the system;

Figure 3 is a fragmentary view of a pump unit;

Figure 4 is a sectional view of the pump;

Figure 5 is a sectional view of a valve for selectively connecting the individual jacks, and Figure 6 is a fragmentary view of the valve illustrated in Figure 5.

Referring to the drawings for more specific details of the invention, 10 represents the frame of a motor vehicle chassis. The frame is supported by front springs 12 and rear springs 14, mounted respectively on a front axle 16 and a rear axle 18 supported by wheels 20 of conventional type.

The chassis is equipped with a conventional hydraulic brake system including a pressure producing element or a master cylinder 22, actuated through a foot pedal lever 24. This pressure producing element is connected by a pipe line or conduit 26 to a two-way valve 28, and a pipe line 30 connects the valve 28 to branch pipe lines or conduits 32 and 34. The conduit 32 is connected to expansible elements or fluid pressure actuated motors 36 for actuating the friction elements of brakes 38 associated with the front wheels of the vehicle, and the conduit 34 is connected to expansible elements or fluid pressure actuated motors 40 for actuating brakes 42 associated with the rear wheels of the vehicle.

The two-way valve 28 may be of any preferred type. As shown, this valve includes a valve chamber 44 having an inlet 46 and outlets 48 and 50 and a valve 52 operated by a hand wheel 54 to open the outlet 48 and close the outlet 50, or to close the outlet 50 and open the outlet 48.

The inlet 46 communicates with the conduit 26 leading from the pressure producing element or master cylinder, and the outlet 48 communicates with the conduit 30 connected to the branch conduits 32 and 34 leading to the expansible elements or motors for actuating the brakes, and the outlet 50 communicates with a conduit 56 leading to a port 58 in a head 60 threaded in the open end of a cylinder 62 having a double diametral bore.

The cylinder 62 is formed in the bottom of a reservoir 64 provided with a cover plate having a vent 66 to the atmosphere. The cylinder 62 has a port 68 closed as by a plug 70 which may be removed for the purpose of bleeding the cylinder, a port 72 providing a communication between the cylinder and the reservoir, and a port 74 communicating with a chamber 76 having therein a spring-pressed ball valve 78 control the port 74, and a closure plug 80 threaded in the chamber 76 provides a seat or an abutment for the spring.

A piston 82 reciprocable in the cylinder 62 has on one end thereof a head 84 fitted snugly in that portion of the cylinder having the larger diammeter, and a head 86 on the other end of the piston is fitted in that portion of the cylinder having the smaller diameter. A return spring 88 is sleeved on the piston between the head 84 and a shoulder joining the larger and smaller portions of the cylinder.

The head 84 of the piston has thereon leakproof cup 90 which engages an annular stop 92 on the head 60 when the piston is in retracted position. The head 86 is grooved or channeled as at 94, and positioned on the head is a leakproof cup 96 held against displacement by a spring 98 interposed between the cup and the closed head of the cylinder.

The valve chamber 76 has a port 100 providing a communication between the valve chamber 76 and a chamber 102. The chamber 102 has a port 104 providing communication between the cylinder and the reservoir, and ports 106 and 108. The port 106 communicates with a pipe line or conduit 110 leading to a hydraulic jack 112 on the front axle of the vehicle, and the port 108 communicates with a pipe line or conduit 114 leading to a hydraulic jack 116 on the rear axle of the vehicle.

A plunger 118 movable in the cylinder 102 has a reduced portion 120 on which are fitted opposed leak-proof cups 122 and 124. This reduced portion provides a chamber 126 communicating by the port 100 with the valve chamber 76, and a diametral bore 128 in the reduced portion communicates with a passage 130 arranged in the plunger parallel to the axis thereof. The passage 130 has fitted therein a sleeve 132 and a rubber washer 134. The sleeve serves as a pilot for connecting the passage 130 with the ports 106 or 108, and the washer serves to seal the connection.

The plunger is urged toward the open end of the cylinder 102 by a spring 136 interposed between the head of the plunger and the closed head of the cylinder, and the open end of the cylinder is closed as by a cap 140. This cap has an axial opening rotatably supporting a sleeve 142 provided with a shoulder 144 bearing against the cap, and a retaining ring 146 on the sleeve prevents displacement thereof.

A recess in the plunger receives the inner end of the sleeve and a key 148 prevents relative axial movements between the sleeve and the plunger. A pointer 150 has a part secured on the shoulder portion of the sleeve. This pointer is adapted to travel over the face of the cap upon which are arranged letters indicating the front and rear jacks, and a knurled flange 152 on the outer end of the sleeve provides means for rotating the plunger to register the passage 130 with either of the ports 106 and 108 and a thumb screw 154 positioned for travel in the sleeve provides means for reciprocating the plunger to connect the passage 130 to either of the ports 106 and 108 and to effectively seal the connection.

Assuming that the system for operating the jacks and the system for operating the brakes are both filled with fluid and that the valve 28 is adjusted to provide free communication between the inlet 46 and the outlet 48, under these conditions regular operations of the brakes will not be affected.

When it becomes desirable to employ either the front or rear jacks, the operator backs out the thumb screw 154 and rotates the plunger 118 to register the passage 130 with either of the ports 106 and 108. The thumb nut 154 is then adjusted to reciprocate the plunger 118 to effectively seal the connection between the passage 130 and the port 106 or 108. The valve 28 is then adjusted to close outlet 48 and to open outlet 50.

With these parts so adjusted, upon operating the foot pedal lever 24 the pressure producing element or master cylinder 22 is actuated to displace fluid therefrom through the pipe line 26 to the cylinder 62. Pressure in the cylinder 62 causes movement of the piston 82 against the resistance of springs 88 and 98 and displacement of fluid from the cylinder 62 through the ports 74 past the valve 78 through valve chamber 76 and port 100 into cylinder 102 and from thence through chamber 126, passages 128 and 130, and either port 106 or 108 and conduits 110 or 114 to the jack, according to the selection made, where the fluid is retained by the check valve 78.

The quantity of fluid displaced by the pressure producing element or master cylinder 22 upon one depression of the foot pedal lever may not be sufficient to fully extend the jack. Hence, upon relieving pressure on the foot pedal lever, the master cylinder 22 returns to its normal position, and likewise the piston 82 in the cylinder 62 returns to its normal position. As the piston 82 returns to its normal position, the cup 96 on the head 98 of this piston collapses and admits fluid through the port 72, the grooves 94 in the head of the piston, and past the cup 96 to the head of the piston; hence, upon a subsequent depression of the foot pedal lever 24 to actuate the piston 82 additional fluid is displaced by the piston 82 through the port 74 past the valve 78 and from thence to the selective means and pipe line or conduit to the jack, thus building up pressure in the jack.

After repeated depressions of the foot pedal lever to build up the desired pressure in the jack for the efficient operation thereof, when it becomes desirable to lower the jack the thumb screw 154 is then backed out to disconnect the passage 130 from the ports 106 or 108, whereupon the fluid is returned from the jack through the pipe line connecting the jack to the selective means to the chamber 102 thereof, and from the chamber 102 through the port 104 to the reservoir, after which the valve 28 is adjusted to open the outlet 48 and to close the outlet 50.

It will be observed that with the pump in inoperative position there is maintained at all times an open communication to the reservoir, and hence the system is fully compensating for changes in the volume of the fluid due to expansion and contraction.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A fluid pressure operated system comprising a pressure producing means, manually operated means for actuating the pressure producing means, expansible means operated by the pressure producing means, a pump operated by the pressure producing means, expansible means operated by the pump, and means for selectively operating the pump and the expansible means operated by the pressure producing means.

2. A fluid pressure operated system comprising a pressure producing means, manually operated means for actuating the pressure producing means, a group of expansible elements operated by the pressure producing means, a pump operated by the pressure producing means, a second group of expansible elements operated by the pump, means for selectively operating one group of expansible means and the pump, and means for selectively operating the individual units of the group of expansible means operated by the pump.

3. A fluid pressure operated system comprising a pressure producing element, a foot pedal lever for actuating the element, a plurality of brakes connected to the system, a pump connected in the system, a plurality of expansible elements connected to the pump, and means for selectively operating the brakes and the pump.

4. A fluid pressure operated system comprising a pressure producing element, a foot pedal lever for actuating the element, a plurality of brakes connected to the system, a pump connected in the system, a plurality of jacks connected to the system, means connected in the system for selectively operating the brakes and the pump, and means for selectively operating the individual jacks.

5. A fluid pressure system comprising means for applying an operating pressure to a system, a plurality of jacks connected to the system, a plurality of brakes connected to the system, a pump connected in the system, a valve connected in the system for selectively rendering the brakes and jacks ineffective, and means associated with the pump for selectively operating the jacks.

6. A fluid pressure operated system comprising a pump including a reservoir, a double diametral cylinder in the bottom thereof having a port providing a communication between the reservoir and the cylinder, a double diametral piston reciprocal in the cylinder having oppositely disposed heads, means operable upon the return stroke of the piston for bypassing fluid from the reservoir to the cylinder forward of the smaller head, a check valve for controlling the outlet of the pump, and a two-way valve communicating with the check valve.

7. A fluid pressure operated system comprising a pump including a reservoir, a double diametral cylinder in the bottom thereof having a port providing a communication between the reservoir and the cylinder, a plug threaded in the outer end of the cylinder having a concentric flange, a double diametral piston reciprocal in the cylinder having oppositely disposed heads, a spring sleeved on the piston between a shoulder formed by the union of the cylinders and the larger head of the piston urging the piston to seat on the flange, a collapsible leak-proof cup on the smaller head of the piston controlling openings through the smaller head of the piston, a spring interposed between the collapsible leak-proof cup and the head of the cylinder, a check valve in the head of the cylinder, and a two-way valve communicating therewith.

8. A fluid pressure operated system comprising a pump including a reservoir, a double diametral cylinder in the bottom thereof having a port providing a communication between the reservoir and the cylinder, a double diametral piston reciprocal in the cylinder having oppositely disposed heads, the piston having reduced body portion providing a chamber communicating with the reservoir, the smaller head of the piston having a plurality of passages providing a communication between the chamber and that portion of the cylinder forward of the smaller head, a collapsible leak-proof cup on the smaller head, a plug threaded in the open end of that portion of the cylinder having the larger diameter, the plug having a concentric flange providing a seat for the piston, a leak-proof cup on the larger head of the piston, a spring sleeved on the piston between a shoulder formed by the union of the smaller and larger portions of the cylinder, a spring interposed between the collapsible leak-proof cup and the head of the cylinder, a check valve in the head of the cylinder, and a two-way valve communicating with the check valve.

WALLACE F. OLIVER.